United States Patent
Nichols

(10) Patent No.: US 6,171,482 B1
(45) Date of Patent: Jan. 9, 2001

(54) SELF-ALIGNING REUSABLE LIQUID FILTERING SYSTEM

(76) Inventor: Bret E. Nichols, 9075 Cottage Loop, Bristow, VA (US) 20136-1743

( * ) Notice: Under 35 U.S.C. 154(b), the term of this patent shall be extended for 0 days.

(21) Appl. No.: 09/307,563

(22) Filed: May 10, 1999

Related U.S. Application Data

(60) Provisional application No. 60/084,967, filed on May 11, 1998.

(51) Int. Cl.$^7$ .................................................. B01D 35/147
(52) U.S. Cl. ........................... 210/130; 210/136; 210/232
(58) Field of Search ..................................... 210/130, 136, 210/168, 232, 440, 443, 444, 450, 453, 493.5, DIG. 17; 123/196 A

(56) References Cited

U.S. PATENT DOCUMENTS

| | | | |
|---|---|---|---|
| 3,557,958 | 1/1971 | Baldwin | 210/136 |
| 3,567,022 | 3/1971 | Thorton et al. | 210/130 |
| 3,957,640 | 5/1976 | Stack | 210/117 |
| 3,984,318 | 10/1976 | Bumb | 210/130 |
| 5,256,280 | 10/1993 | Anderly et al. | 210/130 |
| 5,411,659 | * 5/1995 | Nichols | 210/130 |
| 5,711,872 | 1/1998 | Jones et al. | 210/130 |
| 5,762,788 | * 6/1998 | Gullett | 210/232 |
| 5,817,232 | 10/1998 | Roll et al. | 210/130 |
| 5,830,371 | 11/1998 | Smith et al. | 210/136 |
| 5,846,416 | * 12/1998 | Gullett | 210/232 |
| 5,876,600 | 3/1999 | Matsubara et al. | 210/443 |
| 6,006,924 | * 12/1999 | Sanford | 210/440 |
| 6,016,923 | * 1/2000 | Bauchmann | 210/440 |
| 6,024,229 | * 2/2000 | Ayers | 210/443 |

* cited by examiner

Primary Examiner—Joseph W. Drodge
(74) Attorney, Agent, or Firm—Lacasse & Associates; Wesley L. Strickland; Randy W. Lacasse

(57) ABSTRACT

A fluid filter assembly incorporates a filter element and valve assembly within a filter housing and base plate. The filter element and valve assembly is a single pre-assembled unit which includes an anti-drainback valve seat and diaphragm, a by-pass valve assembly, a pleated paper filter element, and a spring endcap. The filter housing and base plate separably clamp together to enclose the filter element/valve cartridge which is replaceable, as a single assembly, once its filtering ability is degraded. The anti-drainback valve seat engages complementary features on the base plate to correctly align and position the filter/valve cartridge during assembly. Further, a recess within the top of the filter housing receives a protrusion on the filter element endcap to provide additional alignment and to provide pressure to seal the filter/valve cartridge to the base plate in a fluid-tight manner.

15 Claims, 4 Drawing Sheets

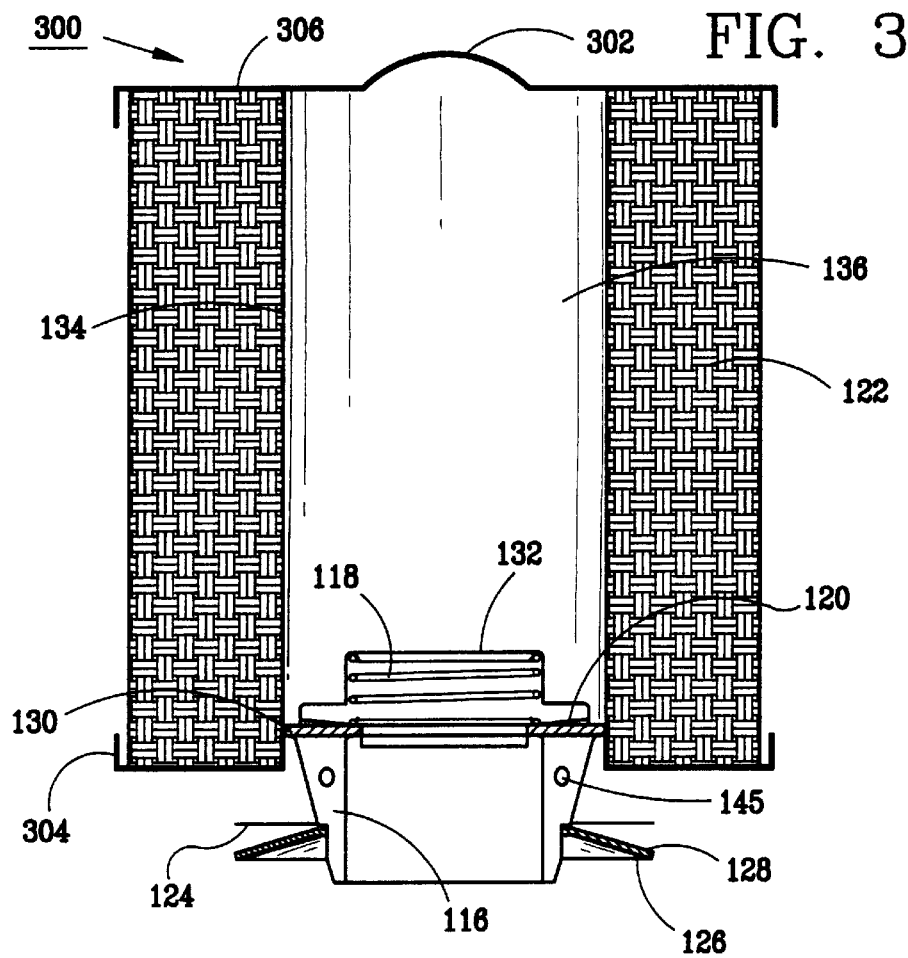
FIG. 3
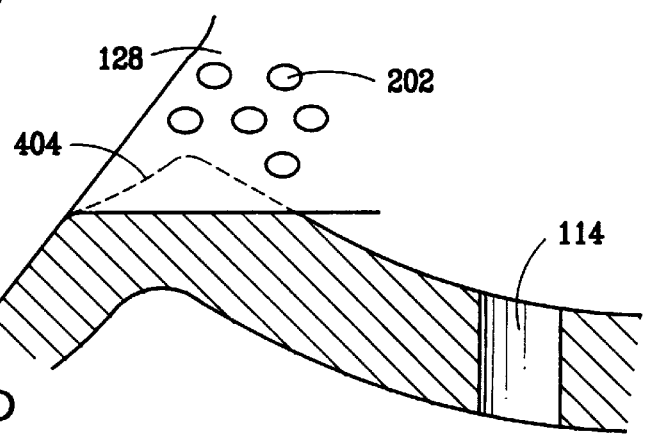
FIG. 4a
FIG. 4b

SELF-ALIGNING REUSABLE LIQUID FILTERING SYSTEM

This application claims the benefit of U.S. provisional application 60/084,967, filed on May 11, 1998.

BACKGROUND OF THE INVENTION

1. Field of Invention

The present invention relates generally to the field of fluid filters. More specifically, the present invention is related to a fluid filter with a replaceable filter element assembly. The device of this invention has particular application in providing a self-aligning, quick-and-easy assembling fluid filter element assembly.

2. Discussion of Prior Art

Until recently, the design of standard spin-on oil filters had not undergone major changes since introduction in the early 1960s. Recently, however, concerns regarding the environmental impact of millions of disposable oil filters have led to the development of reusable filter housings which incorporate replaceable filter elements. Replaceable filter elements contain less residual oil and break down far easier than typical disposable spin-on filters. The current inventor's earlier patent (5,411,659) introduced an exemplary replaceable filter element design. These replaceable filter elements, which are assembled infrequently and usually by do-it-yourself mechanics, must be correctly assembled and aligned within a filter housing to ensure proper operation of the filter and to prevent serious damage to a vehicle's engine. However, the related prior art often includes multi-piece filter and valve assemblies which can be mis-assembled or, at the least, mis-aligned during assembly.

The patent to Baldwin (3,557,958) teaches a standard, disposable oil filter anti-drainback valve positioned near the filter's base plate and constructed of a rubber-like material. While ease of assembly is discussed by this reference, the discussion is limited simply to improved placement of a separate valve seat.

The patent to Thornton (3,567,022) provides for a combination valve assembly, for a standard, disposable oil filter, which includes a relief valve and anti-drainback valve in an integral assembly.

The patent to Stack (3,957,640) provides for a cone-shaped elastomeric anti-drainback valve, for a standard, disposable oil filter, which positions the filter assembly into a correct position for assembly.

The patent to Bumb (3,984,318) provides for a simple to assemble anti-drainback valve which combines the bypass valve and anti-drainback valve on the same support. The example oil filter is of disposable, not reusable, construction.

The patent to Anderly et al. (5,256,280) provides for an anti-drainback valve which rests a valve diaphragm against a slanting valve seat.

The patent to Jones et al. (5,711,872) provides for a reusable filter which incorporates the relief valve as a permanent part of the replaceable filter cartridge.

The patent to Roll et al. (5,817,232) provides for a replaceable filter assembly which has the by-pass valve and anti-drainback valve in a "rebuild" kit separate from the filter element.

The patent to Smith et al. (5,830,371) provides for an alternative arrangement of by-pass valve and anti-drainback valve for a reusable oil filter.

The patent to Matsubara et al. (5,876,600) provides for a two-piece filter housing for a reusable oil filter which uses rotating grooves and channels within each half of the filter housing to keep the housing bodies aligned during assembly.

Whatever the precise merits, features and advantages of the above cited references, none of them achieve or fulfill the purposes of the present invention. Accordingly, it is an object of the present invention to provide for a replaceable fluid filter element assembly which is pre-assembled as a single unit.

It is another object of the present invention to provide for a replaceable fluid filter element assembly which assembles quickly, easily and correctly in a filter housing.

It is an additional object of the present invention to provide for a replaceable fluid filter element assembly which engages self-aligning features of a filter housing.

It is an additional object of the present invention to provide for a self-aligning, replaceable fluid filter element assembly which creates a fluid-tight seal within a filter housing without the need for an endcap spring element.

It is an additional object of the present invention to provide for a self-aligning, replaceable fluid filter assembly for use as an oil filter in an internal combustion engine.

These and other objects are achieved by the detailed description that follows.

SUMMARY OF THE INVENTION

A fluid filter assembly incorporates a filter element and valve assembly within a filter housing and base plate. The filter element and valve assembly is a single pre-assembled unit which includes an anti-drainback valve seat and diaphragm, a by-pass valve assembly, a pleated paper filter element, and an endcap spring. The filter housing and base plate separably clamp together to enclose the filter element/valve unit which is replaceable, as a single assembly, once its filtering ability is degraded. The anti-drainback valve seat engages complementary features on the base plate to correctly align and position the filter/valve unit during assembly. Further, a recess within the top of the filter housing receives a protrusion on the filter element endcap to provide additional alignment and to provide pressure to seal the filter/valve unit to the base plate in a fluid-tight manner.

BRIEF DESCRIPTION OF THE DRAWINGS

FIG. 3 illustrates a cut-away view of the assembled filter element and valve unit assembly of FIG. 2.

FIG. 4a illustrates a detailed view of the base plate of the present invention.

FIG. 4b illustrates a detailed view of the base plate and anti-drainback valve seat surface engagement.

DESCRIPTION OF THE PREFERRED EMBODIMENTS

Figure 1:
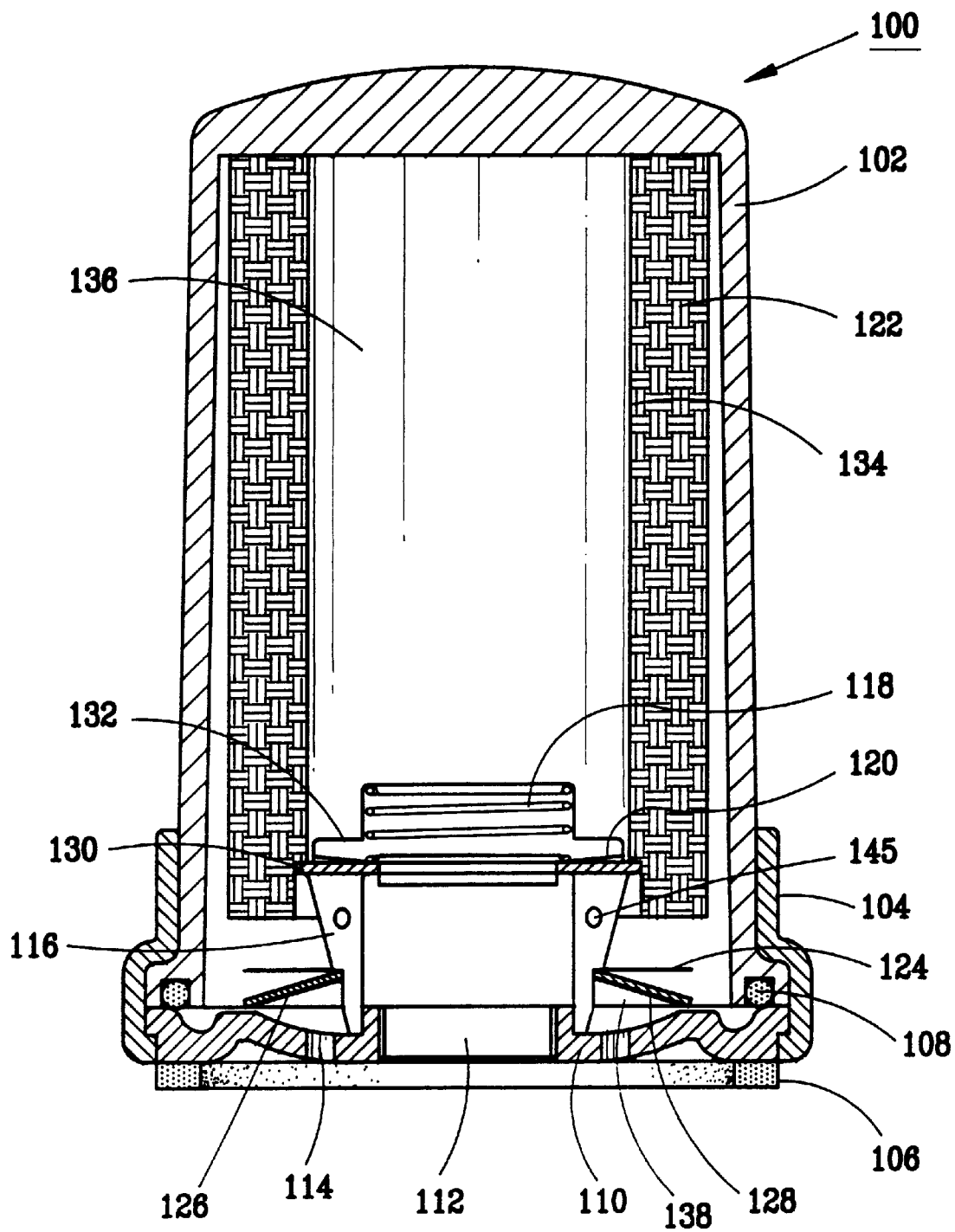
FIG. 1 illustrates a cut-away side view of an assembled fluid filter of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

An assembled fluid filter 100 is illustrated in FIG. 1 and is comprised of three major sub-assemblies: base plate 110, filter housing 102, and a filter and valve cartridge (including elements 116–134).

In a preferred embodiment, fluid filter 100 is attached to an engine block nipple (not shown) by threads inside center exit hole 112. Gasket 106, which is preferably constructed of silicone based rubber, forms a seal against the machine mounting area (not shown).

Filter housing 102, a hollow tube shaped canister, is sealed in a fluid-tight arrangement with base plate 110 by locking band 104. Preferably, filter housing 102 is constructed from automotive nylon; however, injection molded poly, 20 gage cold rolled steel, or other functionally equivalent materials can also be used. Also, the dimensions of filter housing 102 are not an integral part of the current invention; all standard-size filter housings are contemplated.

Locking band 104 is preferably an over-center latch clamp, which is known in the art, and constructed of 20 gage cold rolled steel. The purpose of locking band 104 is to secure base plate 110 to filter housing 102. Furthermore, o-ring 108 ensures the seal is fluid-tight. Other types of functionally equivalent clamping means are also contemplated which provide a secure seal between filter housing 102 and base plate 110 but can be removed without the need for special tools.

Base plate 110 is a contoured, annular disk, preferably constructed of 8 gage cold rolled steel, and has circular center exit hole 112 and a plurality of evenly spaced entry holes 114. Automotive nylon is an alternative, functionally equivalent, construction material which provides the strength and wear-resistance necessary for re-usable base plate 110.

The operation of filter 100 is not considered a novel feature of the present invention but its description is included to show the interaction of all elements of the present invention. In operation, a pump (not shown) provides pressurized fluid to entry holes 114. With references to FIGS. 1 and 2, the fluid enters filter 100 and fills cavity 138 beneath anti-drainback valve seat 126. Once the cavity is filled, the fluid pressure causes the fluid to pass through perforations 202, displace anti-drainback valve diaphragm 128, and enter filter housing 102. Washer 124, constructed of sturdy plastic or steel, prevents diaphragm 128 from overflexing.

Fluid within housing 102 is forced through filter paper element 122, enters column 136 through perforated filter element center column 134, and exits column 136 through hollow by-pass valve receiving area 132 and ultimately center exit hole 112.

If filter paper element 122 becomes clogged, and can no longer pass unfiltered fluid, the resulting fluid pressure forces by-pass valve diaphragm 130, with retainer 120, to compress spring 108 which, in turn, allows fluid to pass through perforated by-pass valve housing 116 at entry holes 145. This mechanism allows fluid, although unfiltered, to return to center exit hole 112 and maintain lubrication in the attached machine (not shown) even if filter paper element 122 no longer works.

When the pump (not shown) stops pumping liquid through the system, the fluid will no longer push against anti-drainback valve diaphragm 128. Anti-drainback valve diaphragm 128 will then rest against perforated anti-drainback valve seat 126 forming a liquid-tight seal. The pressure of the fluid within housing 102 trying to exit filter 100 holds anti-drainback valve diaphragm 128 against anti-drainback valve seat 126.

The construction, materials and size of paper filter element 122 and by-pass valve assembly 116, 118, 120, 130, and 132 are well known industry standards with a number of functionally equivalent alternatives which are contemplated within the scope of this invention.

Figure 2:
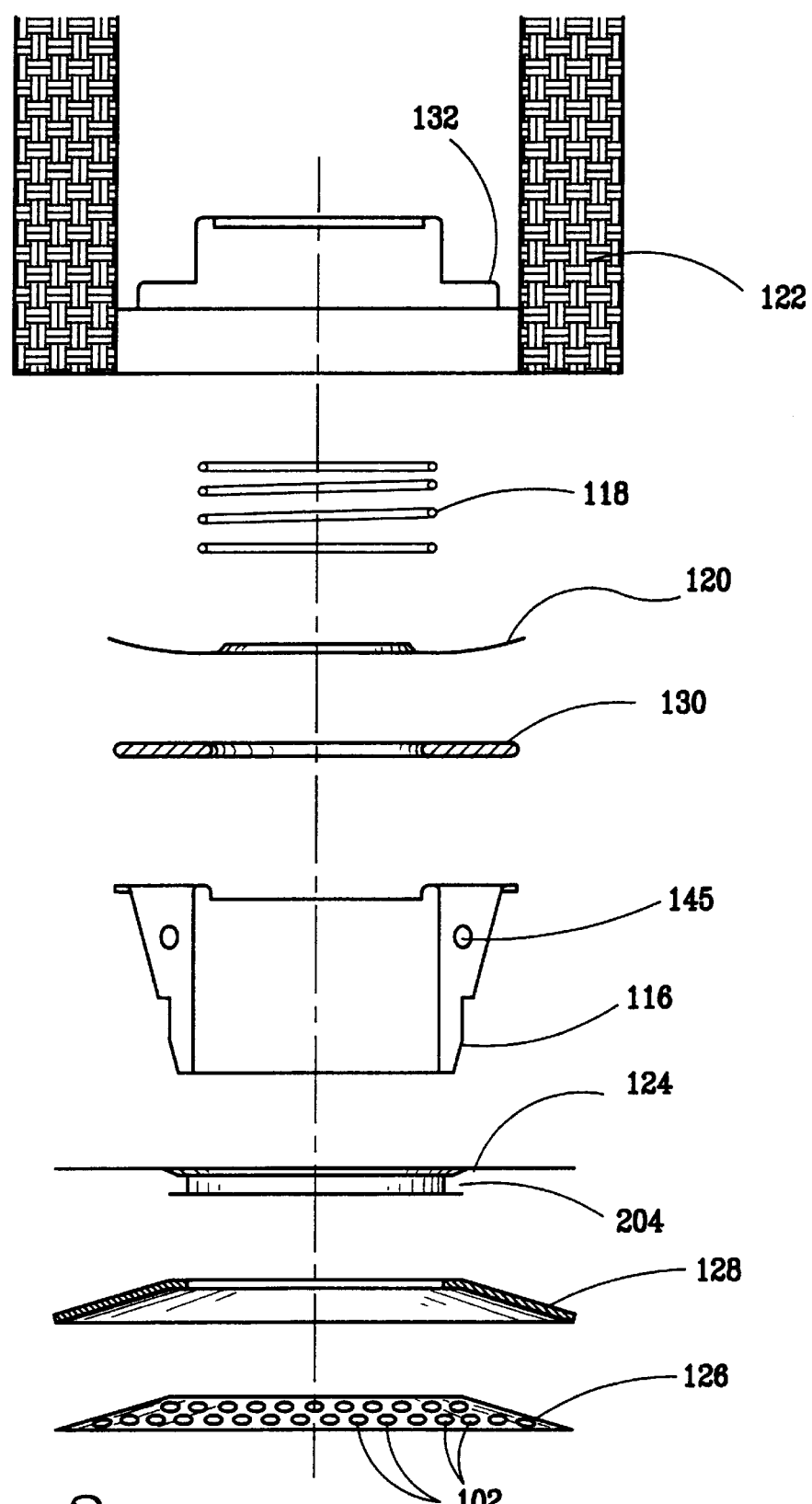
FIG. 2 illustrates an exploded view of the filter element and valve unit assembly of the present invention.

FIG. 2 illustrates an exploded view of the by-pass valve system and the anti-drainback valve system and more clearly shows the number of items that previously had to be individually assembled when replacing a filter cartridge in a reusable filter system. By-pass valve receiving area 132 holds spring 118, by-pass valve retainer 120, by-pass valve diaphragm 130 and perforated by-pass valve body 116. As previously indicated, the operation and construction of a filter by-pass valve is well known.

However, by-pass valve body 116, which is press-fitted into by-pass valve receiving area 132, has a novel tapered region at its bottom which allows washer 124, anti-drainback valve diaphragm 128, and perforated anti-drainback valve seat 126 to be easily attached by press-fitting. Alternative attachment means include spot welding or the use of appropriate adhesive materials; however, press-fitting is a simple manufacturing step and provides sufficient securing forces for all the elements.

Washer 124, constructed of sturdy plastic or steel, prevents diaphragm 128 from overflexing while fluid is flowing through filter 100. Also included in washer 124, is channel 204 which provides even more security for attaching anti-drainback valve diaphragm 128. Diaphragm 128 is preferably constructed of silicon based rubber and conforms in shape to perforated anti-drainback valve seat 126. Neoprene and other resilient materials are also possible construction materials for diaphragm 128; however silicon based rubber, the preferred material, does not become brittle as easily as most of these materials do within this environment. Again, the shape and size of diaphragm 128, depend on the shape and size of anti-drainback valve seat 126; but in relation to one another, diaphragm 128 is slightly larger than seat 126 so that its peripheral edges adequately seal against seat 126 thus preventing fluid from draining back out of baseplate 100 and returning to the machine (not shown) via entry holes 114.

Anti-drainback valve seat 126 is a rigid, perforated support structure the serves a number of purposes. In a preferred embodiment, seat 126 is shaped like a cone; however dome shaped or trapezoidal shaped seats are functionally equivalent. Also, while the preferred construction material for seat 126 is sheet metal, automotive nylon or other sturdy plastic are also contemplated materials. The precise radius of seat 126 is not critical to its function. The two design criteria which must be met is that seat 126 extend past entry holes 114 so that fluid can enter filter 100 and that seat 126 not extend so far that it interferes with the clamping of housing 102 with base plate 110. Our preferred embodiment sizes seat 126 so that it reaches approximately half-way between entry holes 114 and the bottom inside edge of housing 102. The number and size of perforations 202 in anti-drainback valve seat 126 are also not critical. Too few holes or too small of holes cause a back pressure towards the pump (not shown) and too many holes or too large of holes damage the sturdiness and integrity of seat 126. Any arrangement, size and number of perforations which avoid these critical conditions are contemplated by this invention. A working example would be 48 holes evenly spaced in two concentric rings of 24 holes. With this number of holes, the appropriate diameter of each hole is approximately 0.125 inches. These design values provide a structurally sound valve seat that does not impede fluid flow for a typical-sized automobile engine.

An assembled filter element and valve cartridge 300 is illustrated in FIG. 3. This cartridge, completely assembled, fits within filter housing 102 and base plate 110. Instead of disposing of an entire spin-on filter with residual oil, locking band 104 is removed to separate housing 102 and base plate 110, and a used cartridge is removed and replaced by new cartridge 300. Thus only the used cartridge is disposed of. Two elements introduced in FIG. 3 are end cap 306 and element holder 304. These two sheet metal pieces securely hold filter paper element 122 and add some rigidity to cartridge 300.

A key inventive feature of the present invention pertains to insuring that replaceable cartridge 300 can easily be correctly inserted into housing 102 and properly aligned. Misalignment of cartridge 300 causes damage to anti-drainback valve seat 126 and by-pass valve body 116 when base plate 110 is forcibly clamped onto housing 102. Also, even if no damage occurs, both the by-pass valve and anti-drainback valve will not work unless their surfaces are properly sealed and positioned within housing 112.

FIGS. 4a and 4b illustrate a first self-alignment feature to assist with the inserting of cartridge 300. Base plate 110 has ridges 402 for engaging the bottom of perforated anti-drainback valve seat 126. By seat 126 properly sitting on ridges 402, replaceable cartridge 300 is properly centered and aligned within housing 102. To further assist with this self-aligning step in the preferred embodiment, ridges 402 have sloped region 404 which is slightly smaller than the inner diameter of anti-drainback valve seat 126. When seat 126 is somewhat close to being aligned, sloped region 404 guides seat 126 into precise alignment on base plate 110. In the preferred embodiment, ridges 402 are a continuous circle around base plate 110 which engage the peripheral underside of anti-drainback valve seat 126. However, other arrangements are just as effective at providing the self-aligning function; segments of spaced ridges or recesses is an alternative embodiment that also aids in properly positioning cartridge 300 within housing 102.

Figure 5:
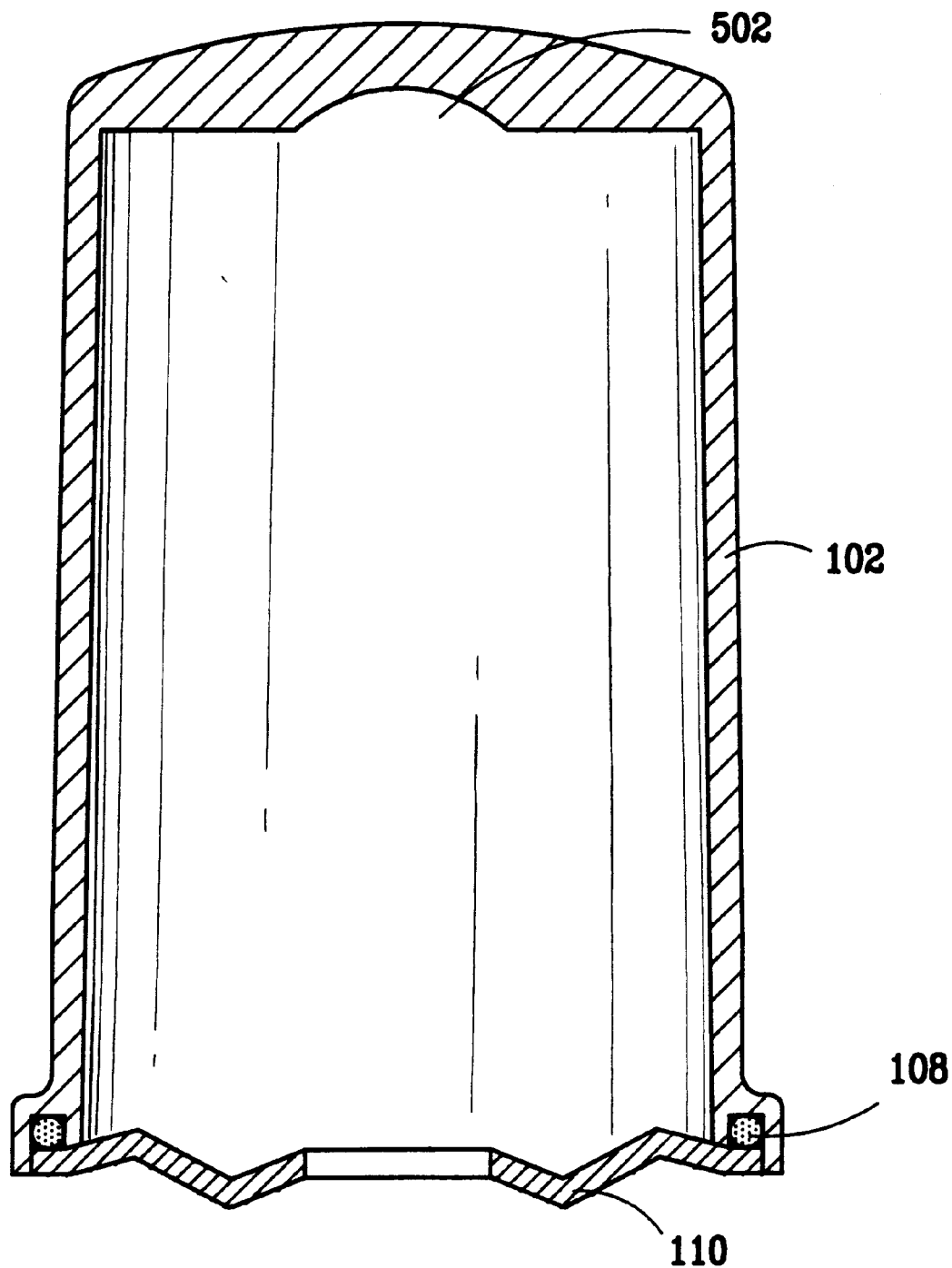
FIG. 5 illustrates a cut-away view of the filter housing and base plate of the present invention.

FIG. 5 illustrates the second self-aligning feature of the present invention. Recessed region 502, on the inside of housing 102, receives complementary convex region 302 located on end cap 306. In a preferred embodiment, the complementary surfaces are spherical in nature and centered in relation to fluid filter 100. Other functionally equivalent alternative shapes and arrangements are also contemplated; however, the spherical shapes of the preferred embodiment provide the benefit of ease of manufacturing. The sloped nature of both concave region 502 and convex region 302 further assist in guiding cartridge 300 into proper position and alignment within housing 102.

A second function of recess 502 and endcap convex region 302 is the elimination of a separate endcap spring (not shown) that is present in current fluid filter designs. By eliminating this spring element, cartridge 300 truly becomes the only element that needs to be replaced when reusing fluid filter 100 and thereby prevents improper insertion and positioning of the spring during assembly. In the preferred embodiment, spherical housing recess 502 has a radius approximately 0.01 inches smaller than spherical endcap convex region 302. This slight size difference is not enough to effect the self-aligning function and provides downward pressure on cartridge 300 that was previously provided by a separate endcap spring. The downward pressure assists in ensuring all appropriate sealing surfaces within housing 102 are fluid-tight.

An alternative embodiment contemplated is to continue to use a separate endcap spring (not shown) in the design of fluid filter 100. In this embodiment, endcap 306 would simply be manufactured as a straight piece (as illustrated in FIG. 1). However, when assembling this embodiment, an operator would have to ensure proper insertion and positioning of the endcap spring and rely solely on base plate 110 self-aligning ridges 402 to properly position cartridge 300.

CONCLUSION

A system and method has been shown in the above embodiments for the effective implementation of replaceable filter element cartridge that is pre-assembled and engages self-aligning features within a reusable filter housing. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, composition, or sealing elements.

What is claimed is:

1. A replaceable oil filter element cartridge assembly for a reusable oil filter comprising:

a filter element;

a by-pass valve assembly;

an anti-drainback valve assembly, said anti-drainback assembly including a self-aligning element interacting with a base plate of said oil filter, and wherein said removable filter element, by-pass valve assembly, anti-drainback valve assembly and self-aligning element are assembled together into a single cartridge assemble to be removed and replaced.

2. A replaceable filter element cartridge assembly for a reusable fluid filter system, as per claim 1, wherein said single cartridge assembly further comprises:

an integrated endcap spring located at a distal end of said filter element, said integrated endcap spring providing an additional alignment function.

3. A replaceable filter element cartridge assembly for a reusable fluid filter system, as per claim 1, wherein said anti-drainback valve assembly comprises:

a valve diaphragm, and said self-aligning element is shaped to provide a self-aligning function.

4. A replaceable filter element cartridge assembly for a reusable fluid filter system, as per claim 3, wherein said anti-drainback valve assembly comprises a perforated valve seat.

5. A replaceable filter element cartridge assembly for a reusable fluid filter system, as per claim 1, wherein said single cartridge assembly is assembled by any of: press-fitting, spot welding or adhesives.

6. A self-aligning reusable oil filter which comprises:

a filter housing having a first closed end and a second open end, said first closed end including a recessed shape;

a base plate connected to said second open end thereby forming a cavity;

a replaceable filter element cartridge located within said cavity, said replaceable filter element cartridge including a mating shape to said recessed shape on a distal end and a mating interface on a proximal end to said base plate to align said cartridge within said cavity.

7. A self-aligning reusable fluid filter system, as per claim 6, wherein:

said replaceable filter element cartridge mating shape comprises an endcap with a convex protrusion, and said recessed shape is a concave region on said filter housing's inner surface of said first closed end which receives said protrusion.

8. A self-aligning reusable fluid filter system, as per claim 7, wherein said concave region is smaller than said convex protrusion.

9. A self-aligning reusable fluid filter system, as per claim 7, wherein:

said replaceable filter element cartridge comprises an anti-drainback valve seat, and said mating interface on a proximal end to said base plate comprises a ridge on said base plate which interacts with said mating interface.

10. A self-aligning reusable fluid filter system, as per claim 9, wherein said ridge is continuous.

11. A self-aligning reusable fluid filter system, as per claim 9, wherein said ridge comprises discrete segments.

12. A self-aligning reusable fluid filter system, as per claim 9, wherein:

said ridge further comprises a slanted shoulder portion, and said slanted shoulder portion guides said valve seat towards said ridge.

13. A self-aligning reusable fluid filter system, as per claim 9, wherein said valve seat is any of conical, dome or trapezoidally shaped.

14. A self-aligning reusable fluid filter system, as per claim 9, wherein said valve seat is perforated.

15. A reusable oil filter includes a one-piece removable filter and valve unit, said unit comprising:

an oil filter element;

a self-aligning end cap operatively connected to a distal end of said oil filter element;

a valve assembly operatively connected to a proximal end of said oil filter element; said valve assembly comprising:

a by-pass valve;

an anti-drainback valve assembly, said anti-drainback valve assembly comprising a perforated alignment element and associated valve diaphragm, and wherein said one-piece removable filter and valve unit are removably inserted into said oil filter and aligned by the interaction of the self-aligning end cap and perforated alignment element.

* * * * *

UNITED STATES PATENT AND TRADEMARK OFFICE
CERTIFICATE OF CORRECTION

PATENT NO.    : 6,171,482 B1
DATED         : January 9, 2001
INVENTOR(S)   : Bret E. Nichols It is certified that error appears in the above-identified patent and that said Letters Patent is hereby corrected as shown below:

Drawings,
Figure 2, delete element number "102" insert -- 202 --.

Column 6,
Line 17, after "implementation of" insert -- a --.
Line 42, delete "assemble" insert -- assembly --.

Signed and Sealed this

Twentieth Day of August, 2002

Attest:

JAMES E. ROGAN
Attesting Officer    Director of the United States Patent and Trademark Office